Figure 1:
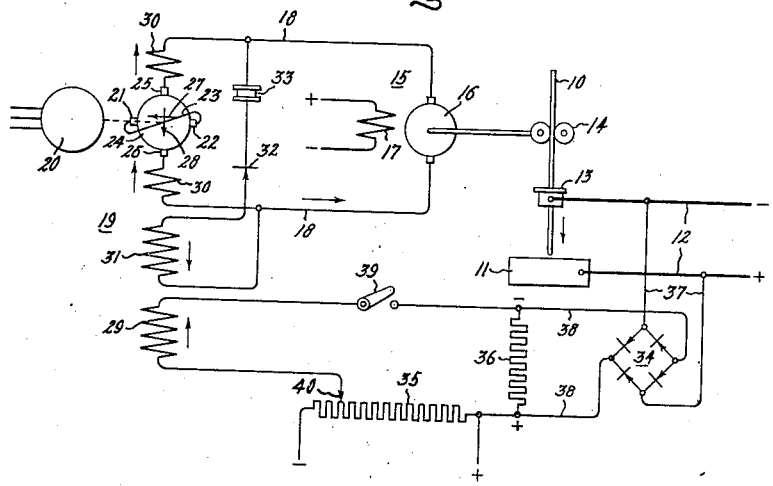

Feb. 16, 1943.   F. C. NEAL, JR   2,311,462
CONTROL APPARATUS
Filed Oct. 16, 1942

Inventor:
Frank C. Neal, Jr.,
by Harry E. Dunham
His Attorney.

Patented Feb. 16, 1943

2,311,462

UNITED STATES PATENT OFFICE 2,311,462

CONTROL APPARATUS

Frank C. Neal, Jr., Dallas, Tex., assignor to General Electric Company, a corporation of New York Application October 16, 1942, Serial No. 462,247

11 Claims. (Cl. 314—71)

This is a continuation-in-part of my application, Serial No. 406,479, filed August 12, 1941.

My invention relates to control apparatus for maintaining a desired characteristic of a circuit. It is particularly suited for striking and maintaining an arc of predetermined voltage between cooperating electrodes of automatic arc welding apparatus.

Various arrangements have been proposed in which the speed and direction of rotation of an electrode feed motor have been controlled in response to an electrical characteristic of the welding circuit to feed an electrode toward and away from its cooperating electrode to strike and maintain a welding arc of desired voltage. In most cases an attempt has been made to provide apparatus that is simple in structure, dependable in operation, and quickly responsive to changes in arc voltage.

Since the open circuit voltage between cooperating arc welding electrodes is much greater than the operating voltage of the welding arc, means have often been provided to decrease the rapid rate at which an electrode is fed toward its cooperating electrode in response to open circuit voltage by control apparatus having the desired quick response for striking and maintaining a welding arc of desired voltage.

Control apparatus has been proposed in which relays and regulators having make and break contacts have been eliminated so that a desired quick response is obtainable. Electronic devices have often been used to accomplish this result.

It is an object of my invention to provide a new and improved control apparatus which does not depend on the use of electronic devices and which does not embody relays or regulators having make and break contacts.

It is a further object of my invention to provide a new and improved control apparatus which is not only simple in structure, but also quickly responsive in operation.

It is also an object of my invention to provide means for maintaining a desired characteristic of a circuit by exerting thereon a controlling effect which varies with the magnitude of a control voltage and is in opposite directions for control voltages of opposite polarity, the magnitude of said control voltage being determined by the magnitude of departures from said desired characteristic of said circuit, the polarity of said control voltage being reversed in response to departures in opposite directions from said desired characteristic, and said control voltage of one polarity which occurs upon departures in one direction only from said desired characteristic being limited through the agency of a polarity responsive means which is connected to said control voltage and limits control current flow to one direction only through a voltage dependent impedance which is also connected to said control voltage and very rapidly decreases and increases its value at a greater rate than the increase and decrease of said control voltage.

It is another object of my invention to provide control apparatus in which the excitation of a dynamo-electric machine forming part thereof is controlled by the linear response of a circuit to departures from a desired characteristic of a circuit to be controlled and also by the nonlinear response of another circuit which acts quickly to prevent undesirable variations from said desired characteristic.

Another object of my invention is to provide control apparatus in which a dynamo-electric amplifier having a high amplification ratio is used to obtain quick response to variations from a desired characteristic of a circuit to be controlled and in which undesirable operation of said dynamo-electric amplifier under certain conditions is prevented by suitably modifying its excitation in accordance with the nonlinear voltage-current characteristic of a quick response circuit which is polarized to be responsive only to voltages that tend to produce such undesired operation.

Figure 2:
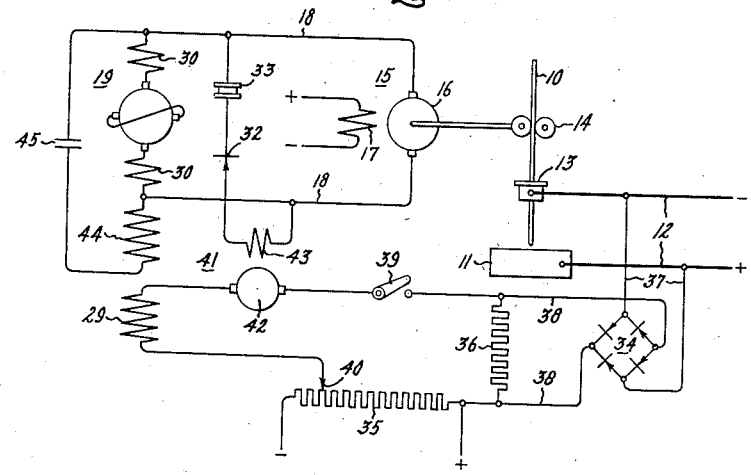

Further objects of my invention will become apparent from a consideration of the accompanying drawing which diagrammatically illustrates in Figs. 1 and 2, two embodiments thereof as applied to automatic arc welding systems.

In the arrangement diagrammatically shown in Fig. 1 of the drawing a fusible metallic electrode 10 is fed toward and away from the work 11 constituting a cooperating electrode, to strike and maintain an arc of predetermined voltage during the welding of a seam in the work. Means not shown may be provided for traversing the work and electrode relatively to one another along the seam to be welded. The electrode 10 and work 11 are connected to a suitable source of arc welding current 12. In the drawing a direct current source has been indicated with the positive terminal thereof connected to the work 11 and the negative terminal connected to the electrode 10 through a nozzle or contact device 13.

Electrode 10 is fed toward and away from the work 11 by feed rolls 14 whose direction and speed of rotation is controlled by a feed motor 15. The electrode feed mechanism may have any suitable construction such, for example, as that shown in United States Letters Patent 2,170,673, Jasper E. Anderson, granted August 22, 1939, and assigned to the assignee of this invention. As shown in the drawing, feed motor 15 is a direct current motor having an armature 16 and a field winding 17. This field winding is connected to a suitable source of direct current supply as indicated in the drawing.

Armature 16 of feed motor 15 is connected through a circuit 18 to be responsive to the voltage output of a direct current dynamo-electric amplifier 19 which is driven by a motor 20. In the drawing this motor 20 has been illustrated as an alternating current motor but it is of course obvious that any suitable electric or mechanical motor may be used.

The dynamo-electric amplifier 19 is preferably a quick response, high amplification generator of the type disclosed and claimed in United States Letters Patent 2,227,992, Ernst F. W. Alexanderson and Martin A. Edwards, granted January 7, 1941, and assigned to the assignee of this invention. This type of generator is known as an "amplidyne" generator. It is a split pole armature-reaction-excited dynamo-electric machine having a set of primary brushes 21, 22 displaced 180 electrical degrees from one another and connected together by a short-circuiting conductor 23 to provide a primary circuit through its armature 24 and a set of secondary or load brushes 25, 26 which are displaced 90 electrical degrees from the primary brushes 21, 22 to provide a secondary circuit through its armature 24. Since the primary brushes 21, 22 are short-circuited, a very small amount of flux is required to induce sufficient voltage between these brushes to build up a relatively large primary current through that part of the armature which is connected between these brushes. This primary current will produce a magnetic flux or primary armature reaction along the primary axis as indicated by arrow 27. As the armature 24 rotates, its conductors which are connected to the secondary or load brushes 25, 26 cut this primary reaction flux and a voltage is induced between these brushes. If these brushes are connected to a load, such as feed motor 15, a secondary or load current will flow through the secondary circuit in the armature between brushes 25, 26 and produce a secondary armature reaction along the axis of these brushes as indicated by the arrow 28 in the drawing.

In order to control the secondary or load characteristic of this generator, a control field winding 29 is arranged to provide a component of magnetic excitation along its secondary commutating axis. The sensitivity of the control provided by this winding 29 is increased by reducing the secondary armature reaction flux through the agency of a compensating field winding 30 which as illustrated in the drawing has been split into two parts. This winding 30, as indicated by the arrows in the drawing, is arranged to provide a component of magnetic excitation along the secondary commutating axis of the generator in opposition to the secondary armature reaction 28. The excitation provided by this compensating field winding 30 is arranged substantially to neutralize the magnetic back coupling of electric current in the secondary armature circuit with the primary armature circuit by substantially neutralizing the armature reaction flux along the secondary axis.

The generator 19 is also provided with a second control field winding 31 which is arranged, as is the control field winding 29, to send flux through the armature of the generator to induce voltage between its short-circuited brushes 21, 22. This control field winding 31 is connected to be responsive to the voltage across load brushes 25, 26 of the generator. It is connected across circuit 18 through a rectifier 32 and an impedance device 33 which substantially instantaneously changes its impedance and consequently the current transmitted therethrough at a greater rate than the rate of change of voltage applied thereto. Device 33 is preferably formed of a synthetic voltage-dependent resistance material consisting of a mixture of carborundum, clay and carbon as described and claimed in United States Letters Patent 1,822,742, Karl B. McEachron, granted September 8, 1931, and assigned to the assignee of this invention. It is usually made up of a plurality of disks whose size and number are selected to give the desired operating characteristics. In the arrangement illustrated device 33 has a characteristic such that not very much current passes therethrough in response to generator voltages suitable for operating motor 15 to feed electrode 10 at a rate to maintain the welding arc. It will be noted that rectifier 32 is a polarity responsive means which renders control field winding 31 responsive to only one polarity of the voltage across load brushes 25, 26 of the generator. When excited, control field winding 31 opposes control field winding 29.

Control field winding 29 is connected to be responsive to a characteristic of the welding circuit 12. In the arrangement illustrated it is connected to be responsive to the difference between the voltage of the welding arc and a fixed voltage of adjustable magnitude through a circuit including a rectifier bridge 34 and potentiometers 35 and 36. The input terminals of the rectifier bridge 34 are connected through conductors 37 with the welding circuit 12 and the output terminals of the rectifier bridge 34 are connected through conductors 38 to potentiometer 36 which is in circuit with the generator control field winding 29. A switch 39 in circuit with control field winding 29 is provided for deenergizing this field to deenergize generator 19.

The difference between the fixed voltage of potentiometer 35 and the voltage of potentiometer 36 which corresponds with the voltage across electrodes 10, 11 controls the direction and amount of exciting flux supplied to generator 19 by its control field winding 29 and thereby the polarity and value of generator voltage applied to feed motor 15 to control the feeding of electrode 10 toward and away from its cooperating electrode 11 to strike and maintain an arc of predetermined voltage. Since arc voltage adjustment depends upon the voltage of potentiometer 35, this latter voltage is made adjustable by providing the potentiometer with an adjustable sliding contact 40.

The rectifier bridge 34 provides a direct current voltage of the proper polarity across potentiometer 36 for comparison with the direct current voltage of potentiometer 35 no matter what the nature of the source of supply connected to the welding electrodes 10 and 11. This source of supply may be alternating current or direct current of the polarity indicated or of reversed polarity.

The rectifier bridge 34 and potentiometers 35 and 36 may be made quite small since only milliampere values of current flow are required to excite control field winding 29. The same is true with regard to rectifier 32 and impedance device 33 in circuit with control field winding 31. This makes it possible to locate rectifier 32 and impedance device 33 within the frame of generator 19 and to mount the potentiometers and rectifier bridge on the welding head where it is readily accessible to the welding operator. Of course other desired mountings may be used.

In order to place the system shown in Fig. 1 in condition for operation, motor 20 is energized to drive its generator 19 and switch 39 is closed to connect control field winding 29 of generator 19 to be responsive to the difference between the voltages across potentiometers 35 and 36.

Before the electrodes are fed into engagement with one another, full open circuit voltage of the welding circuit 12 appears across potentiometer 36 and as reduced by the voltage drop of potentiometer 35 is applied to control field winding 29 to produce a flux through the armature of the generator 19 in the direction indicated by the arrow associated with this control winding. This produces a flow of current in circuit 18 and the operation of motor 15 to feed electrode 10 toward the work as indicated in the drawing by the arrows associated with circuit 18 and electrode 10. Since the open circuit voltage of the welding circuit may be two or more times the desired arc voltage, it will be seen that considerable overexcitation is applied to generator 19. Since this generator is quickly responsive to its excitation and acts as an amplifier having a high ratio of amplification, its output voltage, unless otherwise uncontrolled, would become so great as to cause feed motor 15 to operate at a very high rate of speed to feed and jam electrode 10 into engagement with the work and in some cases bend it, whereupon the flow of welding current would resistance weld it to the work before the inertia forces resulting from this rapid feeding of the electrode toward the work could be overcome by a reversal of generator voltage which would cause motor 15 to feed it away from the work to remove the bend and separate it from the work to strike the arc. In order to eliminate this rapid feeding of the electrode toward the work, the flux of generator control field winding 29 is opposed by the flux of generator control field winding 31. Rectifier 32 connected in circuit with control field winding 31 is poled so that this control field winding is only energized when the output voltage of generator 19 is of the proper polarity to operate feed motor 15 to feed electrode 10 toward the work. Impedance element 33 also connected in circuit with control field winding 31 causes the exciting current and flux of that winding immediately to increase at a much greater rate than the voltage increase of generator 19. Consequently control field winding 31 acts instantaneously to reduce the effect of control field winding 29 on the generator and thereby limits the output voltage of the generator to a value which causes feed motor 15 to feed electrode 10 toward the work 11 at a moderate rate of speed and thereby eliminate the above recited disadvantages of rapid feeding.

As soon as electrode 10 energizes work 11, the voltage of potentiometer 36 becomes zero and the voltage applied to generator control field winding 29 reverses to a value determined by the setting of potentiometer 35. This reversal of voltage reverses the exciting flux of generator 19 from that indicated and consequently its polarity of generated voltage. Feed motor 15 in response to this voltage reversal thereupon reverses its direction of rotation and feeds electrode 10 away from the work 11 to strike the welding arc. As the voltage of this arc increases the voltage of potentiometer 35 is opposed more and more by the voltage of potentiometer 36 until finally equalled and then surpassed, whereupon the flux of control field winding 29 again reverses to produce a generator voltage which will cause feed motor 15 to again reverse its direction and feed electrode 10 toward the work. All this takes place very quickly. As the difference between potentiometer voltage 35 and the desired arc voltage appearing across potentiometer 36 varies, the excitation of control field winding 29 will vary to vary the voltage of the generator and consequently the speed at which the feed motor operates to feed the electrodes toward one another to maintain the welding arc. The quick response and high amplification ratio of the generator causes the control apparatus to respond quickly to changes in arc voltage. So long as the welding arc is maintained the opposing effect of control field winding 31 on control field winding 29 is not very great and it consequently exerts very little damping effect on the operation of the system. This depends of course on the selection of an impedance device 33 having the desired characteristics. If, however, the arc should break so that the difference between open circuit voltage of welding circuit 12 across potentiometer 36 and the voltage of potentiometer 35 is applied to control field winding 29, the restraining effect of control field winding 31 immediately asserts itself in order to prevent generator 19 from supplying abnormal voltage to feed motor 15 and causing it to feed the electrode toward the work too rapidly.

In the arrangement shown in Fig. 1, generator control field winding 29 and its associated circuit constitute means responsive to an electrical characteristic of the welding circuit for controlling the excitation of the generator and consequently the operation of the feed motor to feed electrode 10 toward and away from its cooperating electrode to strike and maintain an arc of desired voltage, and control field winding 31 and its associated circuit constitute means for controlling this excitation controlling means in order to reduce the speed at which electrode 10 is fed toward its cooperating electrode. In Fig. 1 this control is obtained by opposing the fluxes of the two control field windings to reduce the flux of one of them, namely 29. It is, of course, apparent that the flux of control field winding 29 may be reduced in other ways, such, for example, as that diagrammatically illustrated in Fig. 2.

In this figure the flux of control field winding 29 is reduced by opposing the difference in voltages of potentiometers 35 and 36 with the voltage of a generator 41 whose armature 42 is connected in circuit with control field winding 29. This generator 41 is provided with a control field winding 43 which is connected in circuit with a rectifier 32 and an impedance device 33 across circuit 18 in the same manner as control field winding 31 of Fig. 1. Thus in Fig. 2 opposing electro-motive forces are used to control the flux applied to generator 19 by its control field winding 29, whereas in Fig. 1 opposing magnetomotive forces are employed for accomplishing the same result.

The identity of parts in Figs. 1 and 2 have been indicated by applying the same reference numerals to the same parts.

In Fig. 2 generator 19 has been provided with an additional field winding 44. Generator 19 may have a tendency to set up electrical oscillation between itself and motor 15. These oscillations may be substantially eliminated by the proper design of the relationship between the compensation winding and the armature and the control field exciting windings. In some cases, however, it is found desirable to add a separate back coupling circuit to neutralize the internal back coupling effect of alternating current oscillations. This neutralizing back coupling circuit includes the field exciting winding 44 which is arranged on the pole pieces of the generator so as to provide a magneto-motive force on each of these pole pieces acting in a direction opposite to that of the compensation field exciting winding 30. Field exciting winding 44 is energized in accordance with a secondary characteristic of the generator so that in response to alternating current oscillations it will have an opposite effect to the compensating field winding 30. The back coupling neutralizing field exciting winding 44 may be connected in various ways, such for example, as in the manner illustrated through a condenser 45 across the secondary circuit of the generator.

The operation of the system of Fig. 2 is obvious in view of the above described operation of the system of Fig. 1 and the above remarks relative to the features of Fig. 2 that are different from those of Fig. 1.

Instead of using a single means responsive only to one polarity of the voltage of the generator for substantially instantaneously modifying the action of its field exciting means by an amount that increases at a greater rate than the increase of generator voltage, it is of course apparent that two such means might be employed, one for controlling the rate at which one electrode is fed toward another as shown in the drawing, and another for controlling the rate at which it is fed away therefrom. The characteristics of these two means may be independently set by using impedance devices 33 having different operating characteristics.

It is also apparent that the control system illustrated is not limited to automatic arc welding systems for controlling the feed of fusible metallic electrodes. It may be used for controlling the feeding of arc welding electrodes made of carbon or the like or for controlling the feeding of the cooperating electrodes of an atomic hydrogen or similar arc or gas-arc torch. It may also be used for feeding an electrode of a search light or of an arc furnace. It is also apparent that the principles involved are broadly applicable to any control in which a dynamo-electric machine is employed for maintaining a desired characteristic of a circuit to be controlled.

In the particular systems illustrated, it is of course apparent, that field exciting means responsive to welding current flow or to both the current and voltage of the welding circuit may be employed instead of the voltage comparing circuit above illustrated and described. Various other modifications embodying my invention will occur to those skilled in the art and I intend consequently to cover by the appended claims all such modifications and variations which come within the true spirit and scope of my invention.

What I claim as new and desire to secure by Letters Patent of the United States is:

1. Apparatus comprising a circuit, means for maintaining a desired characteristic of said circuit, said means exerting a controlling effect which varies with the magnitude of the voltage applied thereto and is in opposite directions for voltages of opposite polarity, means responsive to departures in either direction from said desired characteristic of said circuit for reversing the polarity of the voltage applied to said first mentioned means and for controlling its magnitude at either polarity in accordance with the departure from said desired characteristic, and means responsive only to that polarity of said voltage which occurs upon departures in one direction only from said desired characteristic of said circuit for limiting said voltage of said polarity, said means including a polarity responsive means which limits control current flow to one direction only through a voltage dependent impedance which very rapidly decreases and increases its value at a greater rate than the increase and decrease of voltage applied thereto.

2. Apparatus comprising a circuit, a generator, means responsive to the magnitude and polarity of the voltage of said generator for maintaining a desired characteristic of said circuit, said means exerting a controlling effect which varies with the magnitude of the voltage applied thereto and is in opposite directions for voltages of opposite polarity, means responsive to departures in either direction from said desired characteristic of said circuit for reversing the excitation and polarity of said generator and for controlling the magnitude of the excitation and voltage of said generator in accordance with the departure from said desired characteristic, and a second means including a polarity responsive means and a voltage dependent impedance for also controlling the excitation of said generator and the magnitude of its voltage of one polarity, said polarity responsive means permitting control current to flow from said generator through said impedance only when the voltage of said generator has that polarity which occurs upon departures in one direction only from said desired characteristic of said circuit and said impedance being of a type which very rapidly decreases and increases its value at a greater rate than the increase and decrease of voltage applied thereto.

3. Apparatus comprising a circuit, means for maintaining a desired characteristic of said circuit, said means exerting a controlling effect which varies with the magnitude of the voltage applied thereto and is in opposite directions for voltages of opposite polarities, a direct current generator, means for connecting said first mentioned means to be responsive to the magnitude and polarity of the voltage of said generator, means responsive to departures in one direction from said desired characteristic of said circuit for inducing a voltage in said generator of one polarity and of a magnitude depending on the magnitude of said departure and responsive to departures in the other direction from said desired characteristic of said circuit for inducing a voltage in said generator of the opposite polarity and of a magnitude depending on the magnitude of said departure, and means responsive only to that polarity of the voltage induced in said generator by said last mentioned means upon departures in one direction only from said desired characteristic of said circuit for limiting the voltage induced in said generator by said last mentioned means, said means including a polarity responsive means which selectively controls the direction of current flow through a voltage dependent impedance which very rapidly decreases and increases its value at a greater rate than the increase and decrease of voltage applied thereto.

4. Apparatus comprising a circuit, means responsive to the magnitude and polarity of the voltage of a direct current generator for maintaining a desired characteristic of said circuit, said generator having an armature provided with short circuited brushes displaced 180 electrical degrees from one another and load brushes displaced 90 electrical degrees from said short circuited brushes, means responsive to the flow of current through said load brushes for generating a flux in said armature of said generator which substantially neutralizes the armature reaction caused by said flow of current, means for directing an exciting flux across said armature of said generator to induce voltage between said short circuited brushes, means responsive to departures in either direction from said desired characteristic of said circuit for controlling the direction and amount of said exciting flux and the polarity and value of generator voltage across said load brushes which is available for obtaining said desired characteristic, and means responsive only to one polarity of the voltage across said load brushes of said generator for substantially instantaneously modifying said exciting flux by an amount that increases and decreases at a greater rate than the increase and decrease of the voltage across said load brushes of said generator.

5. Apparatus comprising a circuit including cooperating electrodes, means including a dynamo-electric machine for feeding one of said electrodes toward and away from its cooperating electrode, means responsive to an electrical characteristic of said electrode circuit for controlling the excitation of said dynamo-electric machine and thereby its operation to feed said one of said electrodes toward and away from its cooperating electrode to strike and maintain an arc of predetermined voltage therebetween, and means including a rectifier poled to be responsive to a voltage condition which occurs only while said one of said electrodes is being fed in one direction for controlling said excitation controlling means and the operation of said dynamo-electric machine to reduce the speed at which said electrode is fed in said one direction.

6. Apparatus comprising a circuit including cooperating electrodes, means including a dynamo-electric machine for feeding one of said electrodes toward and away from its cooperating electrode, means responsive to an electrical characteristic of said electrode circuit for controlling the excitation of said dynamo-electric machine and thereby its operation to feed said one of said electrodes toward and away from its cooperating electrode to strike and maintain an arc of predetermined voltage therebetween, and means responsive only to a voltage condition which occurs while said one of said electrodes is being fed toward its cooperating electrode for controlling said excitation controlling means and the operation of said dynamo-electric machine to reduce the speed at which said one of said electrodes is fed toward its cooperating electrode, said means having a non-linear voltage-current characteristic such that its effect increases and decreases at a greater rate than the increase and decrease of voltage to which its responds.

7. Apparatus comprising a circuit including cooperating electrodes, means including a dynamo-electric machine for feeding one of said electrodes toward and away from its cooperating electrode, means responsive to an electrical characteristic of said electrode circuit for controlling the excitation of said dynamo-electric machine and thereby its operation to feed said one of said electrodes toward and away from its cooperating electrode to strike and maintain an arc of predetermined voltage therebetween, and means including a circuit connected to be responsive to a voltage condition which occurs while said one of said electrodes is being fed toward its cooperating electrode for controlling said excitation controlling means and the operation of said dynamo-electric machine to reduce the speed at which said one of said electrodes is fed toward its cooperating electrode, said circuit including a rectifier connected in series with a resistance which decreases and increases its value substantially instantaneously at a greater rate than the increase and decrease of voltage applied thereto.

8. Apparatus comprising a circuit including cooperating electrodes, means for feeding one of said electrodes toward and away from its cooperating electrode, means including a reversible direct current motor for operating said feeding means, a direct current generator having a field exciting winding for controlling the magnitude and polarity of its generated voltage, a circuit connecting said motor to be responsive to the voltage of said generator, means responsive to the voltage across said electrodes for controlling the direction and amount of exciting flux transmitted through the armature of said generator by its said field exciting winding and thereby the polarity and value of generator voltage applied to said motor and the operation of said motor and said feeding means to strike and maintain an arc of predetermined voltage between said electrodes, and means responsive only to that polarity of the voltage of said generator which is effective for operating said motor to feed said one of said electrodes toward its cooperating electrode for substantially instantaneously decreasing the exciting flux of said field exciting winding of said generator by an amount that increases at a greater rate than the increase of generator voltage.

9. Apparatus comprising a circuit including cooperating electrodes, means for feeding one of said electrodes toward and away from its cooperating electrode, means including a reversible direct current motor for operating said feeding means, a direct current generator having an armature winding and a pair of control field windings arranged to send flux through said armature winding in a direction to generate a voltage therein, a circuit connecting said motor to be responsive to the voltage of said generator, means for energizing one of said control field windings by a direct current the potential and polarity of which are determined by the difference between the voltage across said electrodes and a fixed voltage, and means including a series connecting rectifier and resistance for energizing the other of said control field windings in response to the voltage of said generator, said resistance being of a type that very rapidly decreases and increases its value at a greater rate than the increase and decrease of voltage applied thereto and said rectifier being poled to energize said other control field winding for generating a flux which opposes the flux of said first mentioned control field winding when said generator supplies voltage to said motor in a direction to operate said motor for feeding said one of said electrodes toward its cooperating electrode.

10. Apparatus comprising a circuit including cooperating electrodes, means for feeding one of said electrodes toward and away from its cooperating electrode, means including a reversible direct current motor for operating said feeding means, a direct current generator having an armature provided with one pair of short circuited brushes displaced 180 electrical degrees from one another and another pair of load brushes displaced 90 electrical degrees from said short circuited brushes, a circuit connecting said motor to be responsive to the voltage across said load brushes of said generator, means responsive to the flow of current through said load brushes for generating a flux in said armature of said generator which substantially neutralizes the armature reaction caused by said flow of current, means for directing an exciting flux across said armature of said generator to induce voltage between said short circuited brushes, means responsive to the voltage across said electrodes for controlling the direction and amount of said exciting flux and the polarity and value of generator voltage applied to said motor and thereby controlling the operation of said motor and said feeding means to strike and maintain an arc of predetermined voltage between said electrodes, and means responsive only to that polarity of the voltage across said load brushes of said generator which is effective for operating said motor to feed said one of said electrodes toward its cooperating electrode for substantially instantaneously decreasing said exciting flux by an amount that increases and decreases at a greater rate than the increase and decrease of the voltage across said load brushes of said generator.

11. Apparatus comprising a circuit including cooperating electrodes, means for feeding one of said electrodes toward and away from its cooperating electrode, means including a reversible direct current motor for operating said feeding means, a direct current generator having an armature provided with one pair of short circuited brushes displaced 180 electrical degrees from one another and another pair of load brushes displaced 90 electrical degrees from said pair of short circuited brushes, a compensating field winding connected in series with said load brushes and arranged to send flux through said armature of said generator to neutralize substantially the armature reaction caused by the flow of current through said load brushes, a circuit connecting said load brushes and said compensating field winding in series circuit with said motor, a pair of control field windings arranged to send flux through said armature of said generator to induce voltage between said short circuited brushes, means for energizing one of said control field windings by a direct current the voltage and polarity of which are determined by the difference between the voltage across said electrodes and a substantially fixed voltage, and means including a series connected rectifier and resistance for energizing the other of said control field windings in response to the voltage of said circuit which connects said motor to said load brushes of said generator, said resistance being of a type that very rapidly decreases and increases its value at a greater rate than the increase and decrease of voltage applied thereto and said rectifier being poled to energize said other control field winding for generating a flux which opposes the flux of said first mentioned control field winding when said generator supplies said motor with voltage of that polarity which operates said motor for feeding said one of said electrodes toward its cooperating electrode.

FRANK C. NEAL, Jr.